US00RE41198E

(19) United States
(12) Reissued Patent
Dunn

(10) Patent Number: US RE41,198 E
(45) Date of Reissued Patent: Apr. 6, 2010

(54) METHOD OF DETECTING AUTHORISED BIOMETRIC INFORMATION SENSOR

(76) Inventor: Christopher S. Dunn, 5569 Van Vliet Road, Manotick, Ontario (CA), K4M 1J4

(21) Appl. No.: 11/809,902

(22) Filed: May 31, 2007

(Under 37 CFR 1.47)

Related U.S. Patent Documents

Reissue of:
(64) Patent No.: 6,901,154
Issued: May 31, 2005
Appl. No.: 09/927,236
Filed: Aug. 13, 2001

U.S. Applications:
(63) Continuation-in-part of application No. 08/838,197, filed on Apr. 16, 1997, now abandoned.

(51) Int. Cl.
*G06K 9/00* (2006.01)

(52) U.S. Cl. ..... 382/115; 382/232; 340/5.8
(58) Field of Classification Search ..... 382/115, 382/232, 305, 155, 124, 116, 100; 340/5.53, 340/5.81, 5.8, 5.02, 5.03; 235/380, 384
See application file for complete search history.

(56) References Cited

U.S. PATENT DOCUMENTS

| | | | | |
|---|---|---|---|---|
| 4,819,267 | A | 4/1989 | Cargile et al. | 713/184 |
| 5,280,527 | A | 1/1994 | Gullman et al. | 713/184 |
| 5,869,822 | A | 2/1999 | Meadows et al. | 235/380 |
| 5,953,415 | A | 9/1999 | Nielsen | 705/58 |
| 5,995,630 | A | 11/1999 | Borza | 380/54 |
| 6,385,352 | B1 | 5/2002 | Roustaei | 382/324 |

*Primary Examiner*—Sheela C Chawan
(74) *Attorney, Agent, or Firm*—Perkins Coie LLP

(57) ABSTRACT

In the past, a contact imaging device was physically secured to prevent tampering. When used with network computer systems or communications systems, securing a contact imager is difficult. According to the invention, a method is proposed for securing a contact imaging device from tampering and for ensuring a contact imaging device is an authorised contact imaging device for use with a personal computer, a network application, or a communications application.

86 Claims, 11 Drawing Sheets

METHOD OF DETECTING AUTHORISED BIOMETRIC INFORMATION SENSOR

Matter enclosed in heavy brackets [ ] appears in the original patent but forms no part of this reissue specification; matter printed in italics indicates the additions made by reissue.

This is a continuation-in-part of U.S. patent application Ser. No. 08/838,197 filed on Apr. 16, 1997, now abandoned.

FIELD OF THE INVENTION

This invention relates generally to biometric identification systems and more particularly relates to a method of identifying a biometric data sensor.

BACKGROUND OF THE INVENTION

Computer security is fast becoming an important issue. With the proliferation of computers and computer networks into all aspects of business and daily life—financial, medical, education, government, and communications—the concern over secure file access is growing. Using passwords is a common method of providing security. Password protection and/or combination type locks are employed for computer network security, automatic teller machines, telephone banking, calling cards, telephone answering services, houses, and safes. These systems generally require the knowledge of an entry code that has been selected by a user or has been configured in advance.

Pre-set codes are often forgotten as users have no reliable method of remembering them. Writing down the codes and storing them in close proximity to an access control device (i.e. a combination lock) results in a secure access control system with a very insecure code. Alternatively, the nuisance of trying several code variations renders the access control system more of a problem than a solution.

Password systems are known to suffer from other disadvantages. Usually, passwords are specified by a user. Most users, being unsophisticated users of security systems, choose passwords, which are relatively insecure. As such, many password systems are easily accessed through a simple trial and error process.

A security access system that provides substantially secure access and does not require a password or access code is a biometric identification system. A biometric identification system accepts unique biometric information from a user and identifies the user by matching the information against information belonging to registered users of the system. One such biometric identification system is a fingerprint recognition system.

In a fingerprint input transducer or sensor, the finger under investigation is usually pressed against a flat surface, such as a side of a glass plate; the ridge and valley pattern of the finger tip is sensed by a sensing means such as an interrogating light beam. In order to capture an image of a fingerprint, a system is prompted through user entry that a fingertip is in place for image capture. This is impractical as it likely requires the use of two hands. Another method of identifying fingerprints is to capture images continuously and to analyse each image to determine the presence of biometric information such as a fingerprint. This method requires significant processing image transfer times and is therefore, not suited to many applications.

The use of a biometric imaging device with a personal computer is considered inevitable. Unfortunately, a device specifically designed to gain access to a system secured through biometric information is plausible. Such a device connects to a personal computer in a same fashion as a contact imaging device but does not require provision of biometric information. Some forms of infiltrating biometric systems include a record-play back attack wherein biometric information is intercepted, recorded, and then played back at a later time; repeat pattern sending, wherein patterns are sent to the biometric identification system until an authorisation occurs; etc. It would be advantageous to restrict the use of third party contact imaging systems with a security identification system in order to improve security.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterisation and identification. Today, much of the research focus in biometrics has been directed toward improving the input transducer and the quality of the biometric input data. Fingerprint characterization is well known and can involve many aspects of fingerprint analysis. The analysis of fingerprints is discussed in the following references, which are hereby incorporated by reference:

Xiao Qinghan and Bian Zhaoqi,: An approach to Fingerprint Identification By Using the Attributes of Feature Lines of Fingerprint," IEEE Pattern Recognition, pp 663, 1986;

C. B. Shelman, "Fingerprint Classification—Theory and Application," Proc. 76 Carnahan Conference on Electronic Crime Countermeasures, 1976;

Feri Pernus, Stanko Kovacic, and Ludvik Gyergyek, "Minutaie Based Fingerprint Registration," IEEE Pattern Recognition, pp 1380, 1980;

J. A. Ratkovic, F. W. Blackwell, and H. H. Bailey, "Concepts for a Next Generation Automated Fingerprint System," Proc. 78 Carnahan Conference on Electronic Crime Countermeasures, 1978;

K. Millard, "An approach to the Automatic Retrieval of Latent Fingerprints," Proc. 75 Carnahan Conference on Electronic Crime Countermeasures, 1975;

Moayer and K. S. Fu, "A Syntactic Approach to Fingerprint Pattern Recognition," Memo Np. 73–18, Purdue University, School of Electrical Engineering, 1973;

Wegstein, An Automated Fingerprint Identification System, NBS special publication, U.S. Department of Commerce/National Bureau of Standards, ISSN 0083-1883; no. 500-89, 1982;

Moenssens, Andre A., Fingerprint Techniques, Chilton Book Co., 1971; and,

Wegstein and J. F. Rafferty, The LX39 Latent Fingerprint Matcher, NBS special publication, U.S. Department of Commerce/National Bureau of Standards; no. 500-36, 1978.

In the art of digital communications, error detection and correction is of significant concern. A common method of detecting errors is a checksum. A checksum is determined according to an algorithm and requires processing of all data transmitted. The checksum is then transmitted with the data. At a receiving system, the data is processed analogously and the result is compared with the checksum. When a same value results, the data is considered reliable.

In the art of communications, much research has been performed into reliability and efficiency of specific checksums. Commonly, a standard checksum is selected for a communication network and the same checksum is employed throughout the network. Obviously, for a checksum system to function, all senders and receivers use a same algorithm. Further, as the only concern is communications reliability, a checksum algorithm, once determined to function reliably, is not changed.

It is an object of this invention to provide a method of identifying an authorised biometric sensor.

It is a further object of the invention to provide a method of identifying a sensor used to capture biometric information.

It is a further object of the invention to provide a method of authenticating a biometric information sensor for use with a computer.

SUMMARY OF THE INVENTION

In accordance with the invention there is provided a method of identifying a biometric information sensor comprising the steps of: providing biometric information to the biometric sensor; digitising at least some of the biometric information to provide biometric data samples having locations; determining at least a value in a deterministic fashion in dependence upon biometric data samples at some locations; encoding the at least a value within the biometric data for provision to a computer; and, providing the biometric data samples comprising the encoded data to the computer.

In accordance with the invention there is provided a method of identifying a biometric information sensor comprising the steps of: providing biometric information to the biometric information sensor; digitising at least some biometric information to provide biometric data samples having locations; providing a first signal from a computer indicative of a method of determining and encoding at least a value; determining at least a value in dependence upon the method indicated by the first signal; encoding the at least a value in dependence upon the method indicated by the first signal; providing a second signal comprising the biometric data samples comprising the encoded data to the computer.

In an embodiment the method of identifying a biometric information sensor comprises receiving the second signal from the biometric input sensor at the computer; decoding the second signal to determine encoded data; and, comparing at least a second value determined by the computer to the at least a value from the encoded data.

It is an advantage of the present invention that an authorised biometric sensor and biometric data provided from such a sensor are identifiable.

BRIEF DESCRIPTION OF THE DRAWINGS

An exemplary embodiment of the invention will now be described in conjunction with the attached drawings, in which.

DETAILED DESCRIPTION

The invention is described with respect to fingerprint registration. The method of this invention is applicable to other biometric information as is evident to those of skill in the art.

Figure 1:
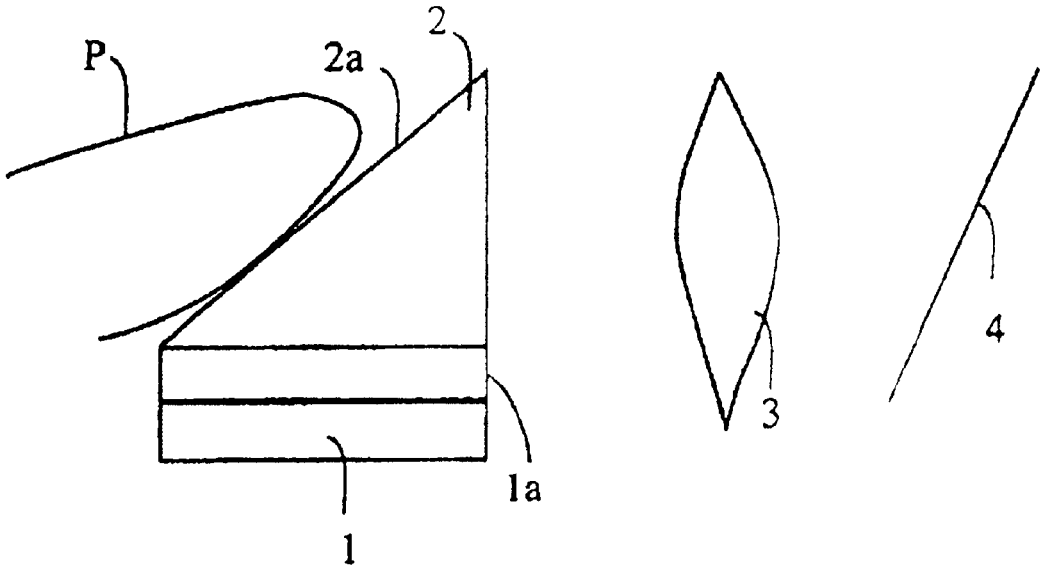
Fig. 1 (PRIOR ART)
FIG. 1 is a simplified diagram of a biometric information sensor in the form of a contact imager for imaging fingerprints according to the prior art.

Referring to FIG. 1, a schematic view shows the construction of a representative embodiment of a known type of optical apparatus. This apparatus comprises a light source 1 and a diffuser 1a for emitting a light beam to the subject fingerprint "P". A triangular prism 2 includes a slanted surface 2a of about 45 degrees inclination angle on which the fingerprint "P" is laid. An image producing lens system 3 is provided for receiving the reflected light beam from the valleys of the subject fingerprint laid on the prism 2 and then producing an image of the subject fingerprint "P" at an area charge coupled device 4 (hereinafter, referred to simply as "the area CCD") for converting the produced fingerprint image into an electric signal; the apparatus further includes an amplifying/analysing circuit B in the form of a signal processing circuit for amplifying then analysing the electric signal for the subject fingerprint provided by the area CCD 4. The transparent triangular prism 2 can be made of glass or another suitable material. Other prism shapes such as polygonal e.g. tetragonal may also be employed. The index of refraction of the prism material is preferably in the range of about 1–2.

The light source 1 is in the form of a multi-light emitting diode (LED) array, although other conventional light sources are also known. A suitable LED array is one of the type described in U.S. Pat. No. 5,210,588 comprising a number of high intensity ultra-luminescence chips, which provides a light intensity of about three (3) times that of common LEDs. The disclosure of U.S. Pat. No. 5,210,588 is incorporated herein by reference.

The image sensor circuit typically converts an image captured by the CCD into an analogue signal for provision to a display device. This supports standards for video such as PAL or NTSC. Unfortunately, the use of a typical image capture apparatus or circuit requires further hardware in the form of a frame grabber to operate with a computer.

In order to breach security of a computer provided with a device according to FIG. 1, a recorder is inserted between the device and the monitor and records a signal provided from the biometric input sensor to the monitor. The recorded signal is then played back to a security access system whenever access to the system is desired.

Figure 2:
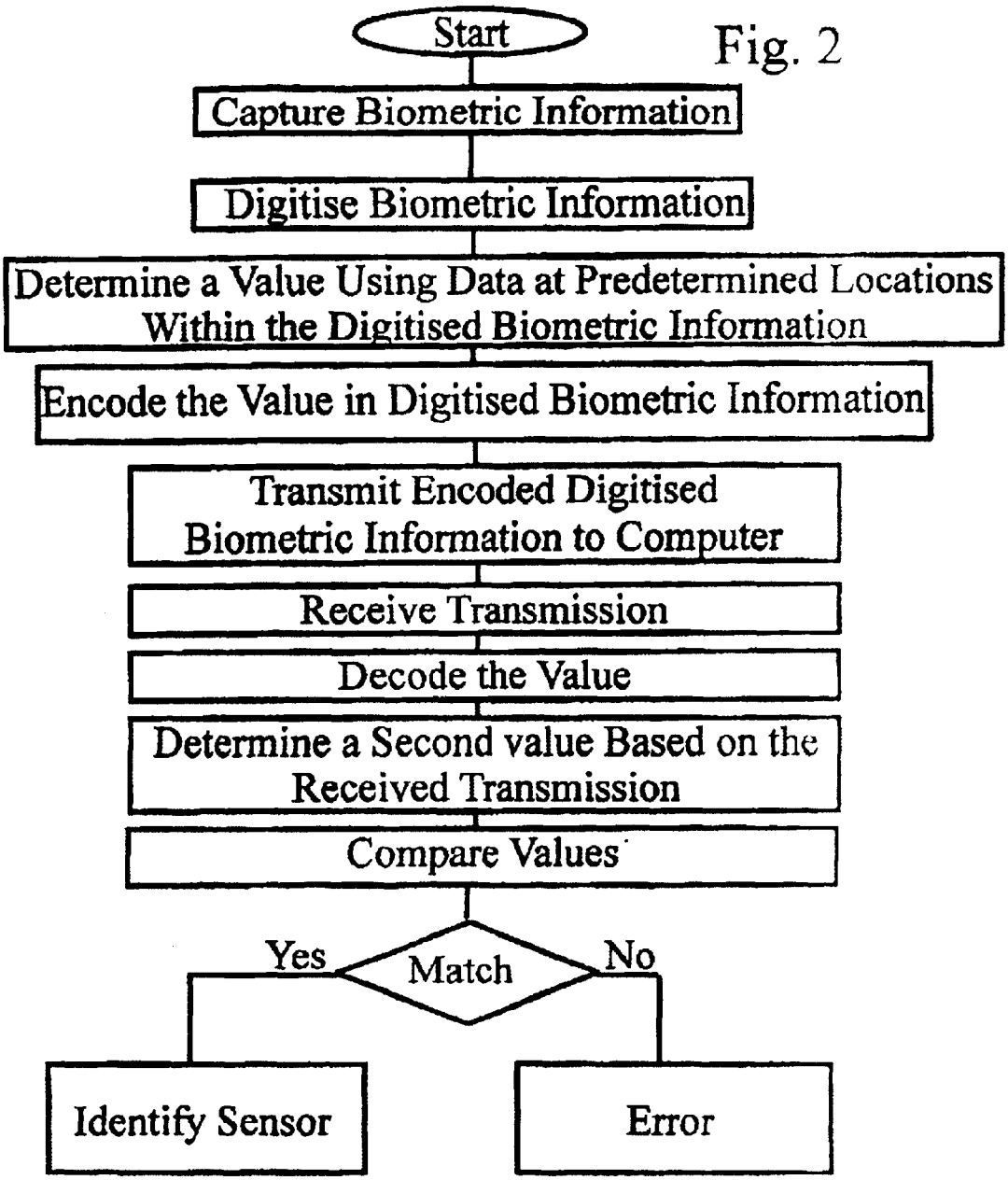
FIG. 2 is a simplified flow diagram of a method of identifying a biometric information sensor according to the invention.

Referring to FIG. 2, a method is shown for increasing security when using a biometric input sensor with a personal computer. The method according to the invention increases security by authenticating the biometric input sensor as an authorised sensor. Authorised sensors are, for example, biometric input sensors provided from a trusted source such as the manufacturer of the sensor or a verification authority such as Verisign™ certifying the authenticity of the sensor. A biometric sensor in the form of a contact imager captures biometric information in the form of a fingerprint. The biometric information in the form of a fingerprint image is digitised for provision to a personal computer. Data, at predetermined locations within the image, is used to generate a value in accordance with a known method unique to biometric information sensors approved by the trusted source and indicative of the trusted source. The value is encoded within the fingerprint image.

Encoding of data within images is possible through several methods described with reference to FIGS. 3a, 3b, 3c . . .

Figure 3A:
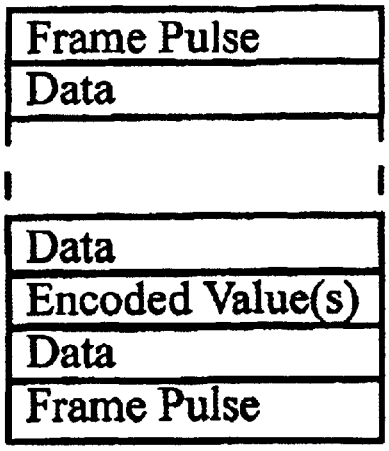
FIG. 3a is a simplified memory diagram of a frame for transmission from a biometric information sensor to a computer according to the invention.

Referring to FIG. 3a, a simplified frame structure having data encoded therein is shown. A standard multiplexing technique is used to transmit the value and the biometric data simultaneously. A frame pulse, indicates the beginning of a frame. As some synchronisation is required according to the method, when used with voice or other biometric information sensors, the frame pulse is a synchronisation signal. Frame pulses and digital sequences used for frame pulses are known in the art of communications. Following the frame pulse, the value and the biometric data samples are interspersed followed by a frame pulse ending the frame. For example, as shown in FIG. 3a, a predetermined amount of data follows the frame pulse. After the predetermined amount of data, the value requiring encoding is inserted. The remainder of the data follows the encoded data and is followed by another frame pulse.

Figure 3B:
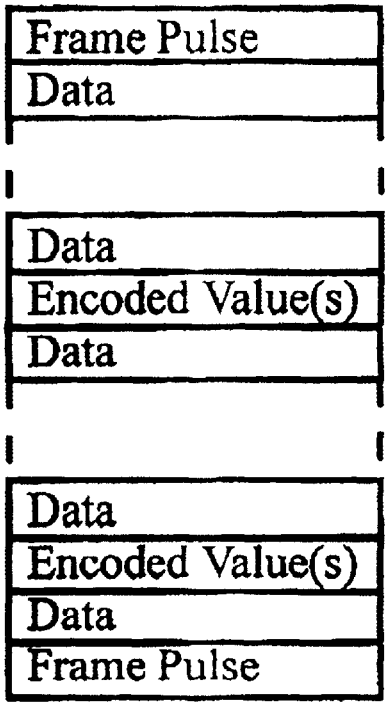
FIG. 3b is a simplified memory diagram of a frame for transmission from a biometric information sensor to a computer according to the invention.

Alternatively, as shown in FIG. 3b, the value is disposed at intervals within the biometric data samples in order to interleave the value to reduce errors and enhance security. It is apparent to those of skill in the art that error correction algorithms such as parity or more complicated error detection/correction methods may be encoded within the frame or alternatively within the value.

Figure 3C:
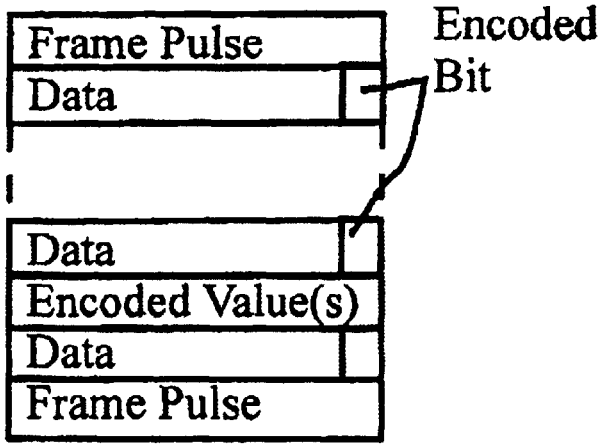
FIG. 3c is a simplified memory diagram of a frame for transmission from a biometric information sensor to a computer according to the invention.

Referring to FIG. 3c, a method of encoding data wherein biometric data samples are overwritten or parts of samples are overwritten with the values requiring encoding is presented. As shown in FIG. 3c, the lowest order bit of each sample byte is replaced with a bit from the value. The result is a frame of biometric information that differs from the digitised biometric information and is encoded in a non-reversible fashion. In order to generate a second value within the computer and dependent upon the biometric data provided to the computer that matches the value, the value must be determined independent of any information replaced through the encoding process.

Figure 3D:
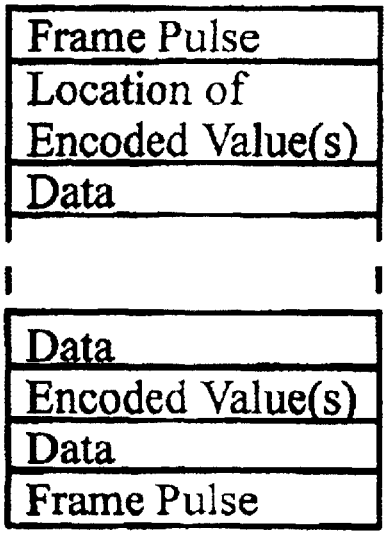
FIG. 3d is a simplified memory diagram of a frame for transmission from a biometric information sensor to a computer according to the invention.

Referring to FIG. 3d, the value is compared with other values within the image and a location of a value within the image that matches the value is determined. The determined location is then stored in a predetermined location within the image.

Returning to the flow diagram of FIG. 2, once encoded, the value and the fingerprint image data are transmitted to a computer. The transmitted fingerprint image data absent the encoded value are sufficient for determining the encoded value therefrom. The computer receives the fingerprint image data and decodes the value. The computer determines a second value using data at the predetermined locations within the received fingerprint image data according to a same algorithm. A comparison of the decoded value against the second value, determined by the computer, identifies the sensor as approved by the trusted source or, alternatively when the values don't match, indicates an error in the fingerprint image data. A detected error is indicative of either a transmission problem or use of an unauthorised sensor. Clearly, when data transmission errors occur, the encoded value and the second value are unlikely to match. Also, when an unauthorised biometric information sensor is used, it is unlikely to encode appropriate information for decoding and comparison.

Figure 4:
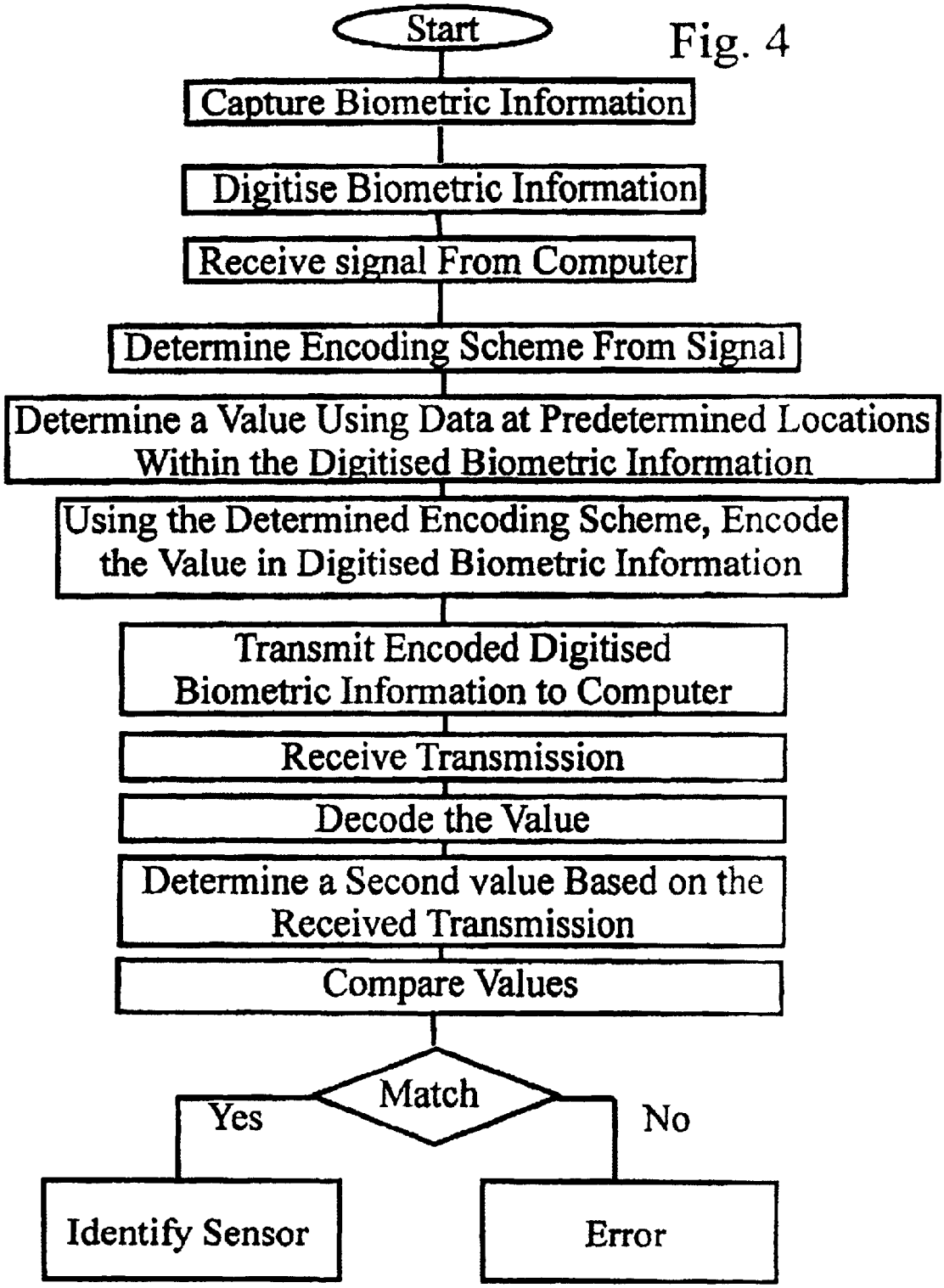
FIG. 4 is a simplified flow diagram of another method of identifying a biometric information sensor according to the invention.

Referring to FIG. 4, a more secure system than that of FIG. 2 is shown. Here, a computer connected to a biometric input sensor in the form of a contact imager provides to the contact imager information relating to encoding of the value in the form of a first location. The contact imager captures biometric information in the form of a fingerprint. The fingerprint data is digitised for provision to a personal computer. Data, at predetermined locations within the image, is used to generate a value. The value is encoded within the fingerprint image starting at the location. In order to prevent record-playback attacks on the security of the system, a location transmitted to the contact imager is varied after a number of uses. Preferably, as shown, the location is varied after every use. Further preferably, the location is selected using a pseudo random number generator.

Figure 5:
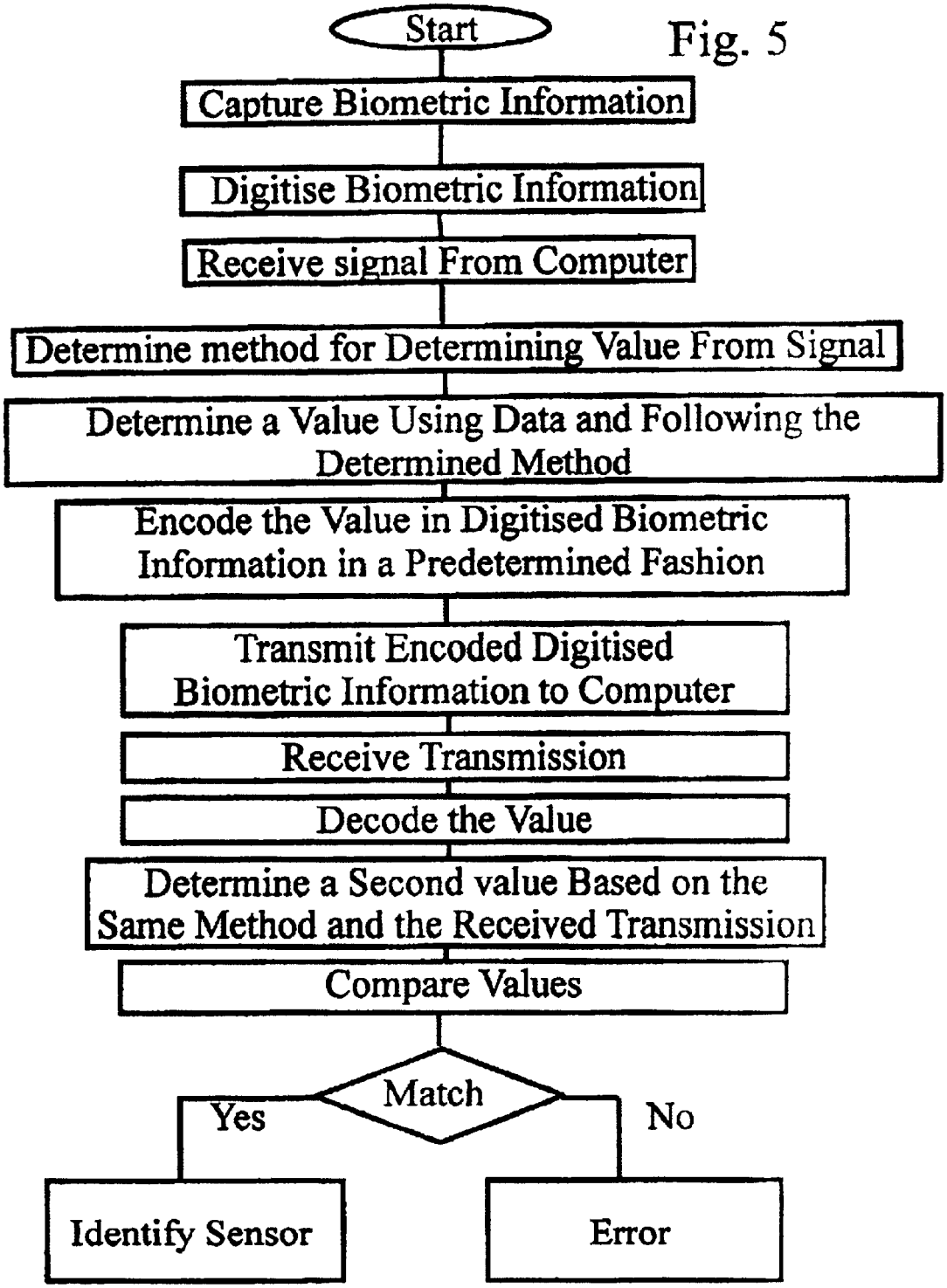
FIG. 5 is a simplified flow diagram of another method of identifying a biometric information sensor according to the invention.

Referring to FIG. 5, a more secure system than that of FIG. 2 is shown. Here, a computer connected to a biometric input sensor in the form of a contact imager provides to the contact imager information relating to determining the value in the form of a plurality of parameters. The contact imager captures biometric information in the form of a fingerprint. The fingerprint data is digitised for provision to a personal computer. Data, at locations within the image determined in dependence upon the parameters, is used to generate a value. The value is encoded within the fingerprint image. In order to prevent record-playback attacks on the security of the system, parameters transmitted to the contact imager are varied after a number of uses. Preferably, the parameters are varied after every use. Further preferably, the parameters are selected using a pseudo random number generator.

Figure 6:
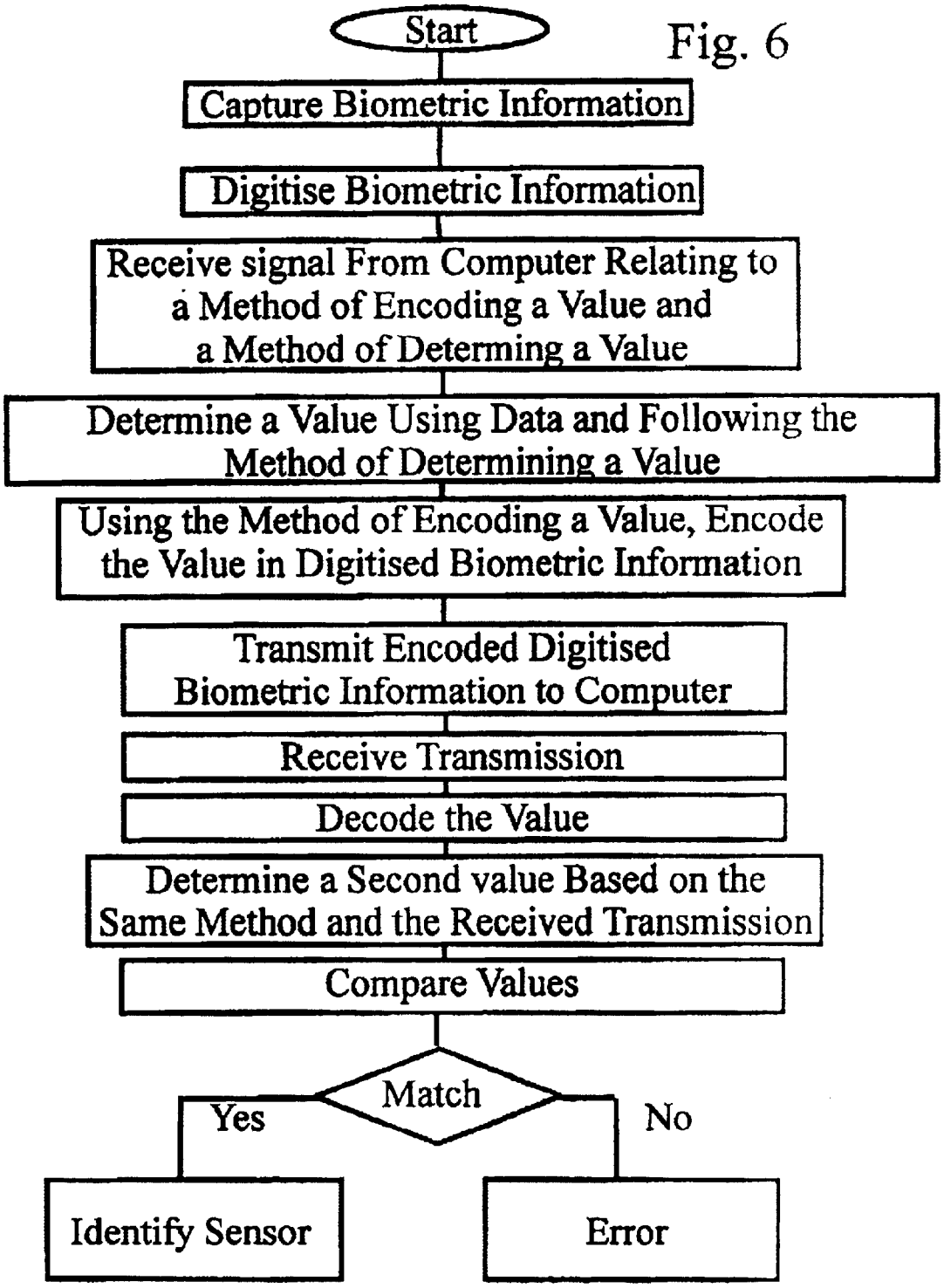
FIG. 6 is a simplified flow diagram of another method of identifying a biometric information sensor according to the invention.

Referring to FIG. 6, a more secure system than that of FIG. 2 is shown. Here, a computer connected to a biometric input sensor in the form of a contact imager provides to the contact imager information relating to determining the value and encoding the value in the form of a plurality of parameters. The contact imager captures biometric information in the form of a fingerprint. The fingerprint data is digitised for provision to a personal computer. Data, at locations within the image determined in dependence upon the parameters, is used to generate a value. The value is encoded within the fingerprint image according to the parameters. In order to prevent record-playback attacks on the security of the system, parameters transmitted to the contact imager are varied after a number of uses. Preferably, the parameters are varied after every use.

Figure 7:
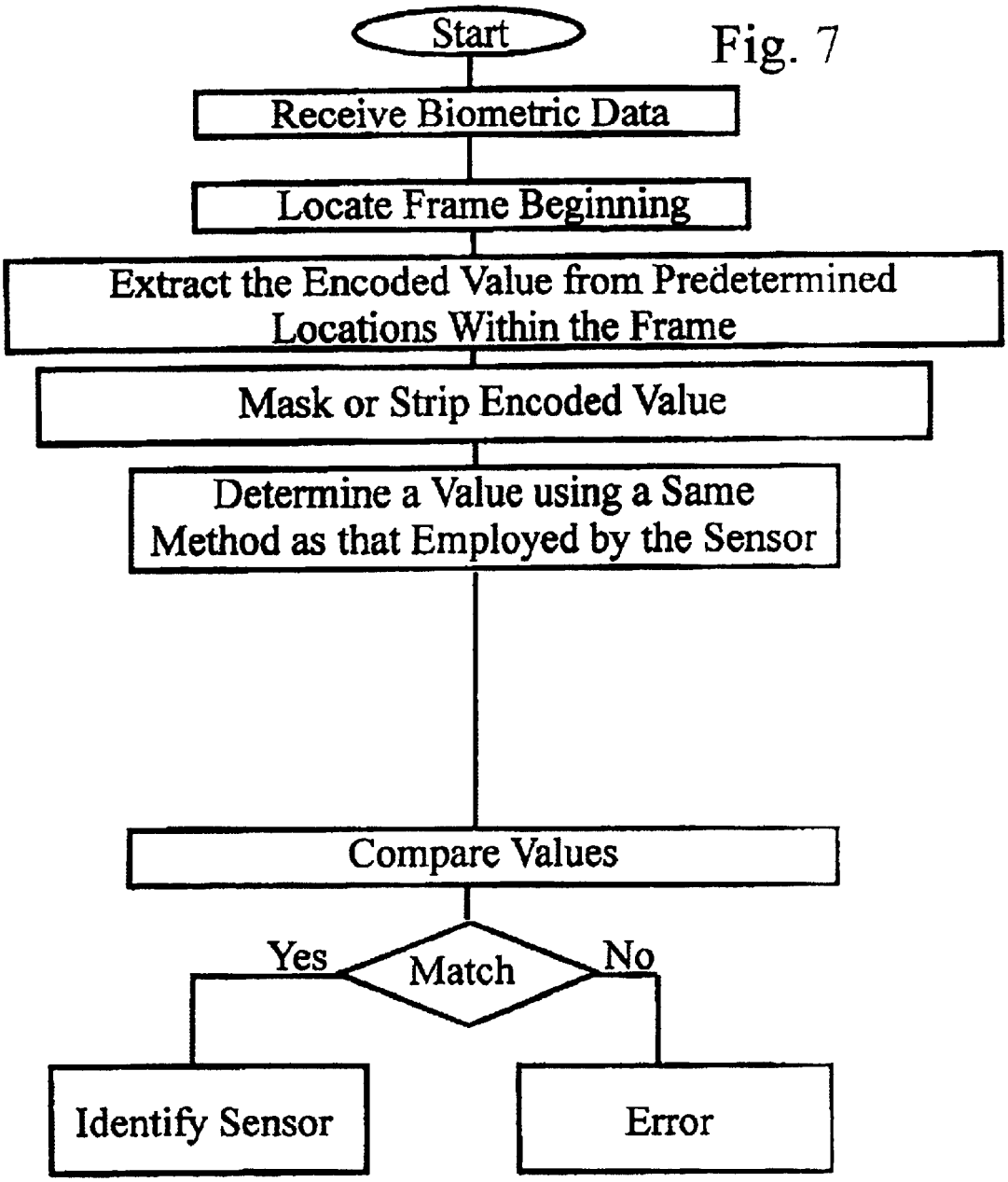
FIG. 7 is a simplified flow diagram of a method of decoding the at least a value encoded into biometric data.

Referring to FIG. 7, a simplified flow diagram of a method of decoding the value encoded into biometric data is shown. The biometric data is received by the computer. A frame indication in the form of a frame pulse or synchronisation signal is used to determine a frame beginning and a frame ending. The computer processes the frame, extracting data from predetermined locations in order to obtain the value. It is apparent to those of skill in the art that decoding the encoded a value is performed in dependence upon the method of encoding employed. The encoding is performed in a predetermined manner or information relating to the encoding method is encoded within the biometric data at predetermined locations.

When the encoded information is transmitted without replacing or overwriting any biometric data, the encoded information is 'stripped' out of the biometric data. When the encoded information is inserted within and in place of some biometric data, the encoded information need not be removed. Of course when desirable, the biometric information within the biometric data is overwritten with predetermined values or other values.

Encoding is explained by way of examples below. A 3 by 3 array of pixel values is shown as an example of an embodiment according to the invention.

0x01 0x08 0x04
0x02 0x0A 0x10
0x01 0x08 0x30

The values are masked with 0xFE—effectively zeroing the lowest order bit—and then summed to provide a value of 0x60. Starting with the first byte, the lowest order bit of each pixel value is replaced with a bit from the value 0x60. The resulting array is:

0x00 0x09 0x05
0x02 0x08 0x10
0x00 0x08 0x30

As is evident from a review of the above arrays, the data has remained substantially the same. For a high contrast image such as a fingerprint, the addition or subtraction of 1 from a plurality of pixels, is known to have a nominal effect. The array is then framed and transmitted to a computer where the value 0x60 is extracted from the array. The array values are then masked with 0xFE and a value is determined. Since the value of 0x60 matches the extracted value, the frame is from an authorised sensor.

Another array of pixel values is shown for better understanding of value determination and encoding.

0x01 0x08 0x04
0x02 0x0A 0x10
0x00 0x08 0x30

The biometric information sensor selects a known method of encoding the data. The method is identified by a method number, in this example 0xC3. Using a single byte to identify methods of encoding allows for up to 256 different methods of encoding to be used. The first byte of the biometric data is replaced with the method identification. When the method identified as 0xC3 is a same method as discussed in the previous example, the encoded array appears as follows:

0xC3 0x08 0x05
0x03 0x0A 0x10
0x01 0x80 0x30

It is of note that the first byte was not used in determining the value as the value of 0xC3 overwrites that byte and it is unavailable to the computer. Also, the encoding begins after the byte 0xC3 when up to 256 encoding methods are employed. When 128 or fewer encoding methods are supported, the first byte may also be encoded with a single low order bit.

When the computer receives the encoded biometric data, a predetermined byte in the form of the first byte is extracted and a determination is made as to the encoding method employed. In accordance with the encoding method used, information is decoded and biometric information and the value are used to verify that the biometric information sensor is authorised.

Of course, security is enhanced significantly by requiring the computer to select the encoding scheme and transmit an identification thereof to the biometric information sensor before encoding commences. Such a system substantially secures against record playback attack. For example, a 12 bit code provided to a biometric sensor is then used in selecting an encoding method, determining a first byte, and determining an encoded value. The number of variations of a 12 bit code are 4096. A record playback system would require a considerable effort. Adjusting the code provided to the biometric sensor to, for example, 12 bytes renders a probability of such an attack being successful, even less probable.

In a further embodiment, the value is encrypted. Encryption is performed in dependence upon public and private keys as well as based on pseudo random and random numbers. For large systems or security driven systems, a private key is stored within each biometric information sensor. The private keys are all the same. Alternatively, they are different. The computer is provided with decryption keys associated with the private keys that are either identical thereto or public key equivalents of the private keys. The use of public and private keys for encryption is well known.

Some encryption algorithms require random numbers. It is generally known that computers provide pseudo random numbers due to some level of predictability. White noise, however, is considered to be truly random. Since transducers inherently are effected by noise, the noise portion of the transducer signal is used to generate a random number for use in encryption. The noise present in the biometric information signal is treated as random noise and used to determine random values for use with an encryption algorithm.

In operation, a biometric information sensor is calibrated and an ambient light level is established. The calibration is preformed at the beginning of each day. Alternatively, the calibration is performed at predetermined intervals throughout each day. Each cell in the charge coupled device receives approximately equivalent diffused light. At least some cells are selected for random number generation. The cells are selected randomly. Alternatively, the cells are selected based on statistical results determinative of random values. Further alternatively, the cells are selected based on a pattern of cell selections.

The selected cells (as well as all other cells) receive light diffused by the diffusing cover 20. The cells also receive backscattered light in the form of noise. The noise is sufficient to effect the induced charge in at least some cells, thereby introducing noise into the CCD signal. The non-noise portion of the signal is filtered out for at least the cells selected and the remaining noise is evaluated. noise values above a predetermined value are defined as a "1" bit while those values below a predetermined value are defined as "0" bits. Alternatively, the noise is quantized into a 2 bit, 3 bit, . . . , n bit value. Alternatively, the noise is not quantized and is used to generate analogue random values.

During fingerprint sensing, a plurality of successive frames or data groups are compared to determine a noise component therein and the noise component is used to determine a substantially random value. Alternatively, lowest order bits are analysed to determine those most likely to fluctuate over time. These bits are then sampled and used to determine substantially random values.

Persons of skill in the art, would be able to test for randomness. One such series of tests is set out in Knuth, Donald E. The Art of Computer Programming Seminumerical Algorithms Vol. 2, Addison Wesley, 1969 on pages 1–155. The analysis of the random nature of the values generated is a straightforward test requiring mere experimentation and verification.

Figure 8:
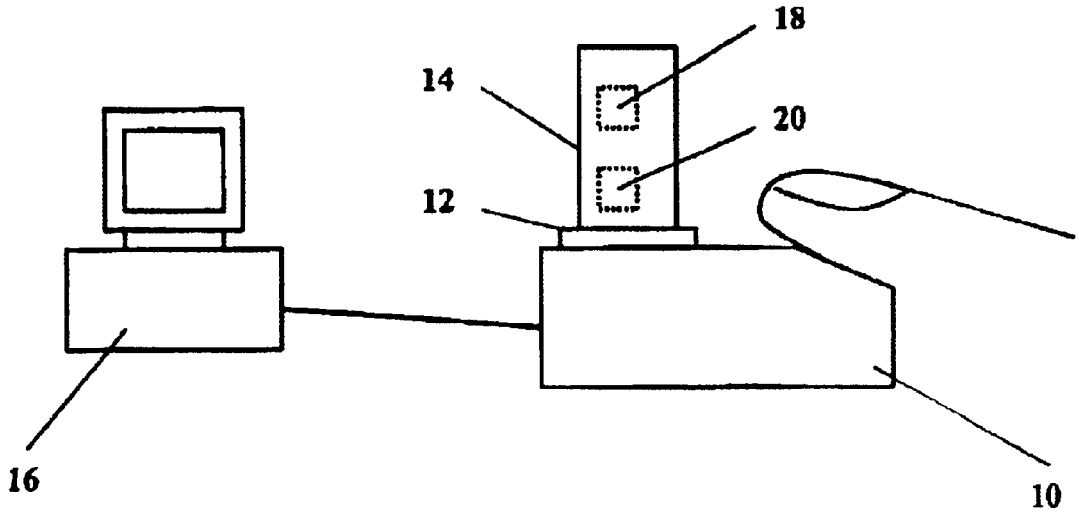
FIG. 8 is a simplified block diagram of another more secure system according to the invention.
Figure 9:
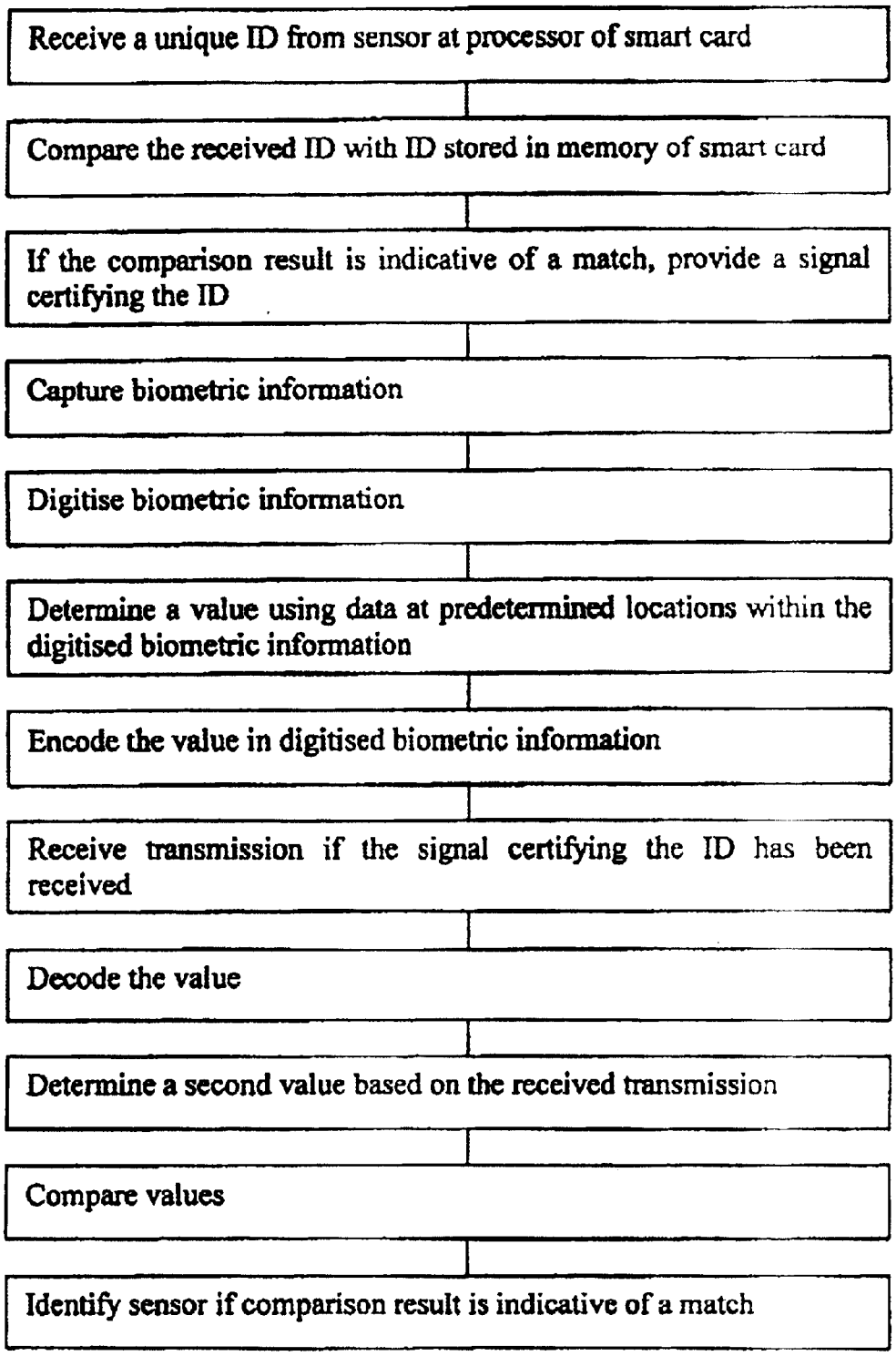
FIG. 9 is a simplified flow diagram of another method of identifying a biometric information sensor according to the invention.

Referring to FIGS. 8 and 9, another more secure system than that of FIG. 2 is shown. Here, a biometric input sensor 10 comprises an interface 12 for receiving, for example, a smart card 14. The smart card 14 acts as an additional source of security verification for the biometric sensor 10. For example, after insertion of the smart card 14 by a user of the biometric sensor a processor 18 of the smart card 14 receives data indicative of a unique ID of the sensor 10 and compares the data with data indicative of the unique ID stored in memory 20 of the smart card 14 in order to produce a comparison result. If the comparison result is indicative of a match the processor provides a signal to the computer 16 certifying the ID of the biometric sensor. This first identification process is then followed by one of the methods outlined above as shown in FIG. 9.

Figure 10:
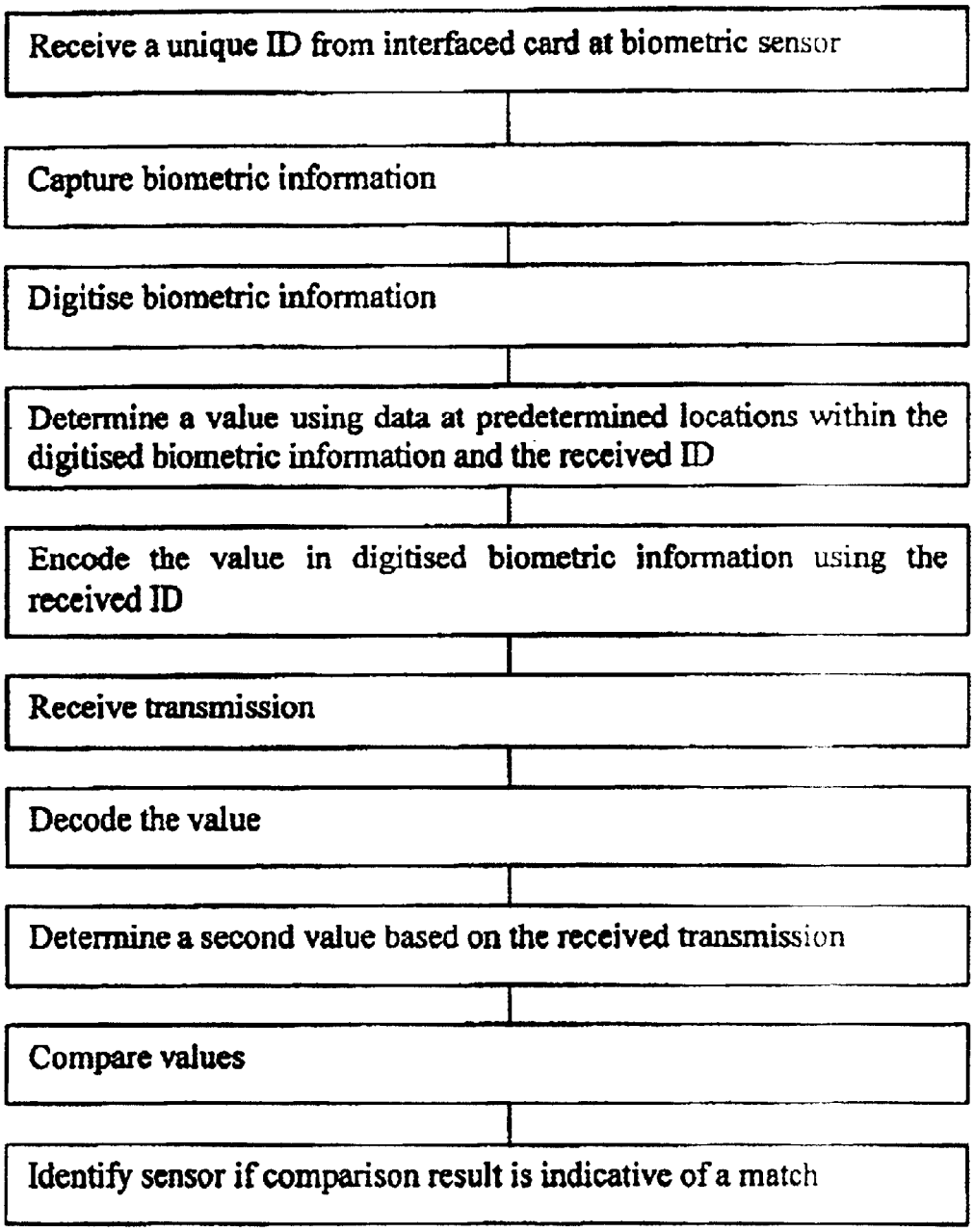
FIG. 10 is a simplified flow diagram of another method of identifying a biometric information sensor according to the invention.

Alternatively, a unique ID stored in memory of a card interfaced with the biometric sensor is provided to the sensor, as shown in FIG. 10. The unique ID is then used, for example, as a parameter in the algorithm for determining a value and encoding the value according to a known method for authenticating the biometric input sensor as originating from a trusted source.

Figure 11:
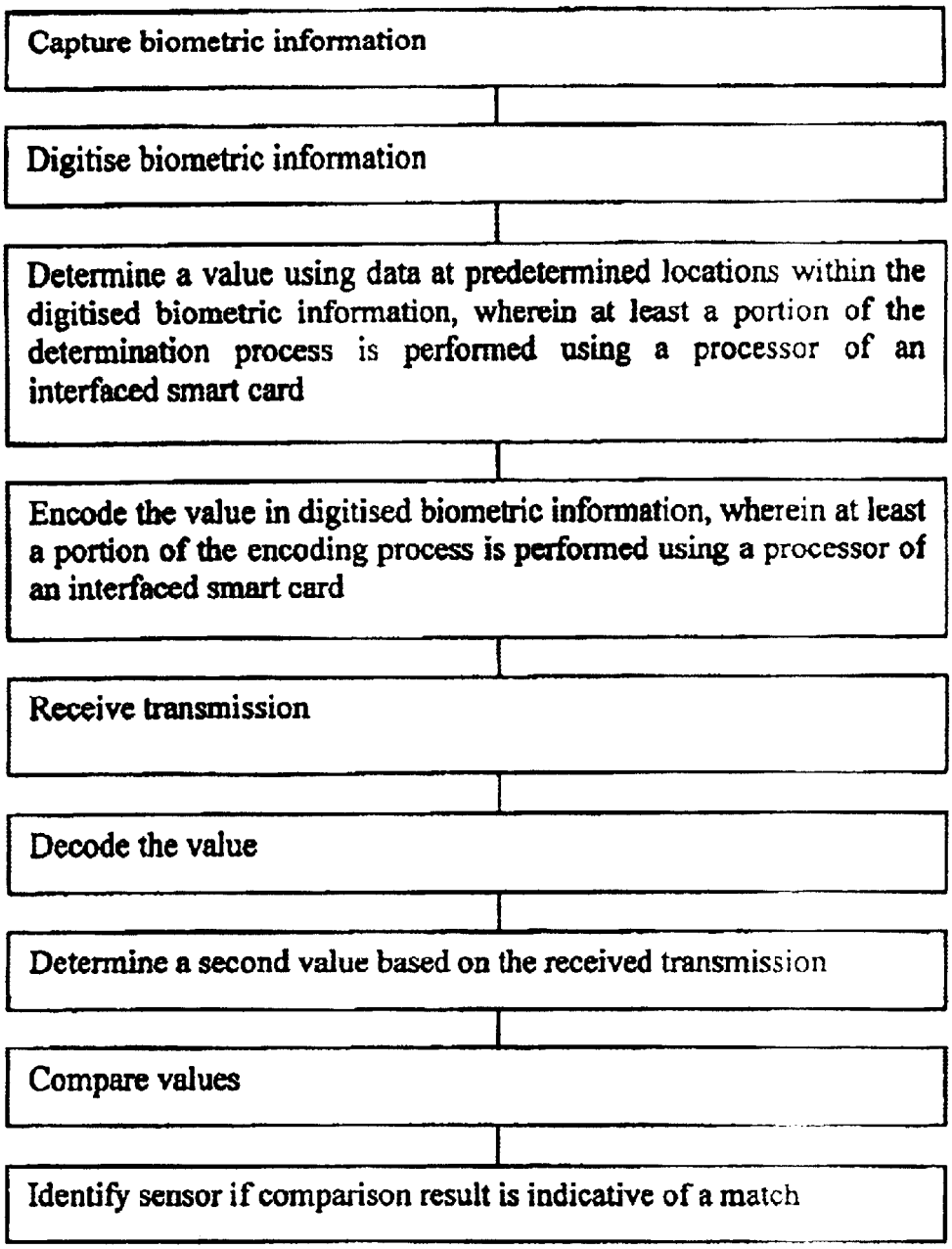
FIG. 11 is a simplified flow diagram of another method of identifying a biometric information sensor according to the invention.

Further alternatively, the steps of determining a value and encoding the value according to known methods are at least partially performed using the processor 18 of the smart card 14, as shown in FIG. 11. Furthermore, data indicative of an algorithm used for determining the value and encoding the value are at least partially stored in memory 20 of the smart card 14.

As is evident to a person of skill in the art, the embodiments shown above using an interfaced card have been described in connection with the method illustrated in FIG. 2 for simplicity and allow also combination with all the other above systems.

Providing a unique ID for determining the value or performing at least a portion of the determination of the value using the processor 18 of the smart card 14 further increases security by dividing the authorisation process into two units, the biometric sensor and the smart card making it substantially more difficult to breach security by tampering with the biometric input sensor 10.

Numerous other embodiments may be envisaged without departing from the spirit and scope of the invention.

What is claimed is:

1. A method of identifying a biometric information sensor comprising:

providing biometric information to the biometric information sensor;

within the biometric information sensor, digitising at least some of the biometric information to provide digital data within the biometric information sensor;

within the biometric information sensor, encoding a value within the digital data, the encoded value related to the digital data and determined in accordance with a known method unique to biometric information sensors approved by a same source of the biometric information sensor and indicative of the same source; and, providing the digital data with the encoded value therein from the biometric information sensor to a computer, the digital data absent the encoded value sufficient for determining the encoded value therefrom, wherein a comparison between the encoded value and another value determined according to the known method is suitable for identifying the biometric information sensor as approved by the same source.

2. A method of identifying a biometric information sensor according to claim 1, wherein the encoded value is shared between the biometric information sensor and the computer to identify the biometric information sensor to the computer.

3. A method of identifying a biometric information sensor according to claim 1, comprising:

receiving a signal comprising data at the biometric information sensor from the computer, and wherein the step of encoding a value is performed in dependence upon the received data.

4. A method of identifying a biometric information sensor according to claim 3, wherein the encoded value is related to the digital data in a deterministic fashion based on the received data.

5. A method of identifying a biometric information sensor according to claim 1, wherein the encoded value is independent of any encoded data for determining data integrity.

6. A method of identifying a biometric information sensor according to claim 1, wherein the encoded value relates the biometric sensor and the digital data to an identifiable biometric information sensor.

7. A method of identifying a biometric information sensor according to claim 1, wherein the digital data comprises a single image data frame.

8. A method of identifying a biometric information sensor according to claim 1, wherein the digital data *comprises* a plurality of different image frames.

9. A method of identifying a biometric information sensor according to claim 1, comprising:

receiving the digital data at the computer;

decoding the digital data to determine biometric data and an encoded value;

using the determined biometric data, determining at [Least] *least* another value related to the biometric data and according to the known method;

comparing the at least another value to the encoded value to provide a comparison result; and, when the comparison result is indicative of a match, authorising the data as originating from an approved biometric information sensor.

10. A method of identifying a biometric information sensor according to claim 1, comprising:

receiving a unique ID from the biometric information sensor at a processor of *a* smart card interfaced therewith;

[compare] *comparing* the received unique ID with data indicative of the unique ID stored in memory of the smart card in order to produce a comparison result;

if the comparison result is indicative of a match, providing a certifying signal certifying the unique ID of the biometric information sensor to the computer.

11. A method of identifying a biometric information sensor according to claim 1, comprising receiving a unique number from a card interfaced with the biometric information sensor.

12. A method of identifying a biometric information sensor according to claim 11, wherein the value is determined using the unique number.

13. A method of identifying a biometric information sensor according to claim 12, wherein the value is encoded [wing] *using* the unique number.

14. A method of identifying a biometric information sensor according to claim 1, wherein at least a portion of the determination of the value is performed using a processor of a smart card interfaced with the biometric information sensor.

15. A method of identifying a biometric information sensor according to claim 14, wherein at least a portion of the encoding of the value is performed using a processor of a smart card interfaced with the biometric information sensor.

16. A method of identifying a biometric information sensor according to claim 1, wherein encoding a value is varied at intervals.

17. A method of identifying a biometric information sensor according to claim 1, wherein the digital data is indicative of an identification of the biometric sensor beyond mere approval by the same source.

18. A method of identifying a biometric information sensor comprising:

providing biometric information to the biometric information sensor;

within the biometric information sensor, digitising at least some biometric information to provide digital data;

providing data from a computer to the biometric information sensor relating to a method of determining and encoding a value;

within the biometric information sensor, determining a value indicative of a unique source of the biometric information sensor according to the method of determining a value;

within the biometric information sensor, encoding the value indicative of the biometric information sensor according to the method of encoding a value;

providing the digital data comprising the encoded value from the biometric information sensor to the computer, the digital data absent the encoded value sufficient for determining the encoded value therefrom, wherein a comparison between the encoded value and another value determined according to the known method is suitable for authenticating the biometric data as originating from an approved source.

19. A method of identifying a biometric information sensor as defined in claim 18, comprising:

receiving the digital data comprising the encoded value from the biometric input sensor at the computer;

decoding the digital data comprising the encoded value according to a method substantially the reverse of the method of encoding a value, the step of decoding to decode a value;

determining a second value according to the method of determining a value; and, comparing the decoded value and the second value to determine whether the biometric information sensor is an authorised biometric information sensor.

20. A method of identifying a biometric information sensor as defined [an] *in* claim 18, wherein the data provided from the computer to the biometric information sensor is a synchronisation signal comprising one of a number, a [dale] *date*, and a time.

21. A method of identifying a biometric information sensor as defined in claim 18, wherein the method of determining a value is one of a plurality of predetermined deterministic methods of determining a value each identified by a numeric identifier.

22. A method of identifying a biometric information sensor as defined in claim 18, wherein the method of encoding a value is one of a plurality of predetermined methods of encoding a value each identified by a numeric identifier.

23. A method of identifying a biometric information sensor as defined in claim 18, wherein providing the digital data comprising the encoded value to the computer is performed by providing a signal comprising a frame pulse and the digital data comprising the encoded value disposed within an image data frame.

24. A method of identifying a biometric information sensor as defined in claim 23, wherein encoding of the value is performed by inserting the value at a predetermined location within the image data frame.

25. A method of identifying a biometric information sensor as defined in claim 23, wherein encoding of the value is performed by replacing a portion less than the whole of the digital data with a portion of the value.

26. A method of identifying a biometric information sensor according to claim 18, wherein the data provided from the computer is varied at intervals.

27. A method of identifying a biometric information sensor comprising:

receiving biometric information provided to the biometric information sensor;

within the biometric information sensor, digitising at least some of the biometric information to provide digital data;

providing a portion of the digital data from the biometric information sensor to a computer;

identifying the biometric information sensor to the computer as an authorised biometric information sensor, the information derived in accordance with a verifiable method wherein verification of the method is indicative of the biometric information sensor being an authorised biometric information sensor; and, in dependence upon the shared information, identifying the biometric information sensor to the computer as an authorised biometric information sensor.

*28. A system for identifying a biometric information sensor, comprising:*

*a biometric information sensor that receives biometric information and digitizes at least some of the biometric*

*information to provide digital data, said biometric information sensor including a component that encodes a value within the digital data, the encoded value related to the digital data and determined in accordance with a known method associated with a source of the biometric information sensor; and*

*a computer that receives the digital data with the encoded value therein from the biometric information sensor, wherein the computer is programmed to determine the encoded value from the digital data by comparing the encoded value and another value determined according to the known method for identifying the biometric information sensor as being associated with the source.*

*29. A system for identifying a biometric information sensor according to claim 28, wherein the encoded value is shared between the biometric information sensor and the computer to identify the biometric information sensor to the computer.*

*30. A system for identifying a biometric information sensor according to claim 28, wherein data at predetermined locations within the biometric information is used by said biometric information sensor to generate said value encoded within the digital data in accordance with said known method associated with said source.*

*31. A system for identifying a biometric information sensor according to claim 30, wherein the biometric information sensor receives a signal comprising data from the computer, and wherein the biometric information sensor encodes the value in dependence upon the received data.*

*32. A system for identifying a biometric information sensor according to claim 31, wherein the data from the computer indicates a first location within the biometric information for use in generating said value.*

*33. A system for identifying a biometric information sensor according to claim 31, wherein the data from the computer includes a plurality of parameters that indicate locations within the biometric information for use in generating said value.*

*34. A system for identifying a biometric information sensor according to claim 31, wherein the encoded value is related to the digital data in a deterministic fashion based on the received data.*

*35. A system for identifying a biometric information sensor according to claim 28, wherein the encoded value is independent of any encoded data for determining data integrity.*

*36. A system for identifying a biometric information sensor according to claim 28, wherein the encoded value relates the biometric information sensor and the digital data to an identifiable biometric information sensor.*

*37. A system for identifying a biometric information sensor according to claim 28, wherein the digital data comprises a single image data frame.*

*38. A system for identifying a biometric information sensor according to claim 28, wherein the digital data comprises a plurality of different image frames.*

*39. A system for identifying a biometric information sensor according to claim 28, wherein the computer is programmed to decode the digital data to determine biometric data and an encoded value and, using the determined biometric data, to determine at least another value related to the biometric data and according to the known method, to compare the at least another value to the encoded value to provide a comparison result and, when the comparison result is indicative of a match, to authorize the data as originating from an approved biometric information sensor.*

*40. A system for identifying a biometric information sensor according to claim 28, further comprising a smart card having a processor and a memory, said processor of said smart card receiving a unique ID from the biometric information sensor and comparing the received unique ID with data indicative of the unique ID stored in said memory of the smart card in order to produce a comparison result, wherein if the comparison result is indicative of a match, said smart card provides a certifying signal certifying the unique ID of the biometric information sensor to the computer.*

*41. A system for identifying a biometric information sensor according to claim 28, further comprising a card interfaced with the biometric information sensor that provides a unique number to the biometric information sensor.*

*42. A system for identifying a biometric information sensor according to claim 41, wherein the value is determined using the unique number.*

*43. A system for identifying a biometric information sensor according to claim 42, wherein the value is encoded using the unique number.*

*44. A system for identifying a biometric information sensor according to claim 28, further comprising a smart card having a processor interfaced with the biometric information sensor, said smart card performing at least a portion of the determination of the value using said processor.*

*45. A system for identifying a biometric information sensor according to claim 44, wherein said processor of said smart card performs at least a portion of the encoding of the value.*

*46. A system for identifying a biometric information sensor according to claim 28, wherein encoding said value by said component of said biometric information sensor is varied at intervals.*

*47. A system for identifying a biometric information sensor according to claim 28, wherein the digital data is indicative of an identification of the biometric sensor in addition to approval by the source.*

*48. A system for identifying a biometric information sensor according to claim 28, wherein the computer provides data to the biometric information sensor relating to a method of determining and encoding the value, and wherein said biometric information sensor determines the value according to the method of determining the value and said component encodes the value according to the method of encoding the value.*

*49. A system for identifying a biometric information sensor as defined in claim 48, wherein computer is programmed to receive the digital data comprising the encoded value from the biometric input sensor, to decode the digital data comprising the encoded value according to a method substantially the reverse of the method of encoding a value in order to decode a value, to determine the another value according to the method of determining a value, and to compare the decoded value and the another value to determine whether the biometric information sensor is an authorized biometric information sensor.*

*50. A system for identifying a biometric information sensor as defined in claim 48, wherein the data provided from the computer to the biometric information sensor is a synchronization signal comprising one of a number, a date, and a time.*

*51. A system for identifying a biometric information sensor as defined in claim 48, wherein the method of determining a value is one of a plurality of predetermined deterministic methods of determining a value each identified by a numeric identifier.*

*52. A system for identifying a biometric information sensor as defined in claim 48, wherein the method of encoding a value is one of a plurality of predetermined methods of encoding a value each identified by a numeric identifier.*

*53. A system for identifying a biometric information sensor as defined in claim 48, wherein the digital data comprising the encoded value is provided to the computer by the biometric information sensor by providing a signal comprising a frame pulse and the digital data comprising the encoded value disposed within an image data frame.*

*54. A system for identifying a biometric information sensor as defined in claim 53, wherein the component encodes the value by inserting the value at a predetermined location within the image data frame.*

*55. A system for identifying a biometric information sensor as defined in claim 53, wherein the component encodes the value by replacing a portion less than the whole of the digital data with a portion of the value.*

*56. A system for identifying a biometric information sensor according to claim 48, wherein the data provided from the computer is varied at intervals.*

*57. A biometric information sensor according to claim 48, wherein the data received from the computer is varied at intervals.*

*58. A biometric information sensor, comprising:*

*a sensing component that receives biometric information and digitizes at least some of the biometric information to provide digital data;*

*an encoding device that encodes a value within the digital data, the encoded value related to the digital data and determined in accordance with a known method associated with a source of the biometric information sensor; and*

*a transmitter that transmits the digital data with the encoded value therein from the biometric information sensor to a computer for a determination of the encoded value from the digital data to identify the biometric information sensor as associated with the source.*

*59. A biometric information sensor according to claim 58, wherein the encoded value is shared with the computer by the transmitter to identify the biometric information sensor to the computer.*

*60. A biometric information sensor according to claim 58, wherein data at predetermined locations within the biometric information is used by said encoding device to generate said value encoded within the digital data in accordance with said known method associated with said source.*

*61. A biometric information sensor according to claim 60, further comprising a receiver that receives a signal comprising data from the computer, and wherein the encoding device encodes the value in dependence upon the received data.*

*62. A biometric information sensor according to claim 61, wherein the data received from the computer indicates a first location within the biometric information for use in generating said value.*

*63. A biometric information sensor according to claim 61, wherein the data received from the computer includes a plurality of parameters that indicate locations within the biometric information for use in generating said value.*

*64. A biometric information sensor according to claim 61, wherein the encoded value is related to the digital data in a deterministic fashion based on the received data.*

*65. A biometric information sensor according to claim 58, wherein the encoded value is independent of any encoded data for determining data integrity.*

*66. A biometric information sensor according to claim 58, wherein the encoded value relates the biometric information sensor and the digital data to an identifiable biometric information sensor.*

*67. A biometric information sensor according to claim 58, wherein the digital data comprises a single image data frame.*

*68. A biometric information sensor according to claim 58, wherein the digital data comprises a plurality of different image frames.*

*69. A biometric information sensor according to claim 58, further comprising an interface that interfaces with a smart card having a processor and a memory, said interface providing a unique ID to the processor of said smart card for comparison with data indicative of the unique ID stored in said memory of the smart card in order to produce a comparison result, wherein if the comparison result is indicative of a match, said smart card provides a certifying signal certifying the unique ID of the biometric information sensor to the computer.*

*70. A biometric information sensor according to claim 69, wherein said interface interfaces with said processor so as to allow said processor to perform at least a portion of the determination of the value.*

*71. A biometric information sensor according to claim 70, wherein said interface interfaces with said processor so as to allow said processor to perform at least a portion of the encoding of the value.*

*72. A biometric information sensor according to claim 58, further comprising an interface that interfaces with a card that provides a unique number to the interface.*

*73. A biometric information sensor according to claim 72, wherein the value is determined using the unique number.*

*74. A biometric information sensor according to claim 73, wherein the value is encoded using the unique number.*

*75. A biometric information sensor according to claim 58, wherein encoding said value by said component is varied at intervals.*

*76. A biometric information sensor according to claim 58, wherein the digital data is indicative of an identification of the biometric sensor in addition to approval by the source.*

*77. A biometric information sensor according to claim 58, further comprising a receiver that receives from the computer data relating to a method of determining and encoding the value, further comprising a second component that determines the value according to the method of determining the value and said component encodes the value according to the method of encoding the value.*

*78. A biometric information sensor as defined in claim 77, wherein the data received from the computer is a synchronization signal comprising one of a number, a date, and a time.*

*79. A biometric information sensor as defined in claim 77, wherein the method of determining a value is one of a plurality of predetermined deterministic methods of determining a value each identified by a numeric identifier.*

*80. A biometric information sensor as defined in claim 77, wherein the method of encoding a value is one of a plurality of predetermined methods of encoding a value each identified by a numeric identifier.*

*81. A biometric information sensor as defined in claim 77, wherein the digital data comprising the encoded value is provided to the computer by said transmitter by providing a signal comprising a frame pulse and the digital data comprising the encoded value disposed within an image data frame.*

*82. A biometric information sensor as defined in claim 81, wherein the component encodes the value by inserting the value at a predetermined location within the image data frame.*

*83. A biometric information sensor as defined in claim 81, wherein the component encodes the value by replacing a portion less than the whole of the digital data with a portion of the value.*

*84. A method of identifying a biometric information sensor, comprising:*

*receiving biometric information at the biometric information sensor;*

*digitizing at least some of the biometric information to provide digital data,*

*providing a portion of the digital data from the biometric information sensor to a computer; and*

*identifying the biometric information sensor to the computer as an authorized biometric information sensor using information derived in accordance with a verifiable method wherein verification of the method is indicative of the biometric information sensor being an authorized biometric information sensor.*

*85. A system for identifying a biometric information sensor, comprising:*

*a biometric information sensor that receives biometric information and digitizes at least some of the biometric information to provide digital data, said biometric information sensor configured to provide a portion of the digital data for processing; and*

*a computer that receives the digital data and that receives information derived in accordance with a verifiable method wherein verification of the method is indicative of the biometric information sensor being an authorized biometric information sensor, said computer configured to identify the biometric information sensor as an authorized biometric information sensor using said information.*

*86. A system for identifying a biometric information sensor, comprising:*

*means for digitizing at least some of biometric information provided to the biometric information sensor to provide digital data;*

*means for providing a portion of the digital data for processing;*

*means for receiving the digital data and information derived in accordance with a verifiable method wherein verification of the method is indicative of the biometric information sensor being an authorized biometric information sensor; and*

*means for identifying the biometric information sensor as an authorized biometric information sensor using said information.*

* * * * *